United States Patent
Zhu et al.

(10) Patent No.: US 9,195,773 B2
(45) Date of Patent: Nov. 24, 2015

(54) STRUCTURE-BASED ADAPTIVE DOCUMENT CACHING

(75) Inventors: Bin Benjamin Zhu, Edina, MN (US); Kaimin Zhang, Hefei (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 840 days.

(21) Appl. No.: 13/177,428

(22) Filed: Jul. 6, 2011

(65) Prior Publication Data

US 2013/0013859 A1 Jan. 10, 2013

(51) Int. Cl.
*G06F 17/30* (2006.01)

(52) U.S. Cl.
CPC ................................ *G06F 17/30902* (2013.01)

(58) Field of Classification Search
CPC .............. G06F 17/30716; G06F 17/30722; G06F 17/30896; G06F 17/30902
USPC .................. 715/234, 243, 254, 255
See application file for complete search history.

(56) References Cited

U.S. PATENT DOCUMENTS

| | | | |
|---|---|---|---|
| 6,272,598 B1 * | 8/2001 | Arlitt et al. | 711/133 |
| 8,275,790 B2 * | 9/2012 | Fredricksen et al. | 707/782 |
| 2002/0143984 A1 | 10/2002 | Hudson Michel | |
| 2008/0046575 A1 * | 2/2008 | Bouazizi | 709/228 |
| 2010/0069104 A1 * | 3/2010 | Neil et al. | 455/466 |
| 2010/0185650 A1 * | 7/2010 | Topatan et al. | 707/769 |
| 2010/0281051 A1 | 11/2010 | Sheffi et al. | |
| 2011/0035345 A1 * | 2/2011 | Duan et al. | 706/12 |

OTHER PUBLICATIONS

Psounis, Konstantinos, "Class-based Delta-encoding: A Scalable Scheme for Caching Dynamic Web Content," 2002, pp. 1-7.*
Cai et al., "VIPS: a Vision-based Page Segmentation Algorithm," 2003, pp. 1-29.*
Achuthsankar et al., "Improving Performance of World Wide Web by Adaptive Web Traffic Reduction," World Academy of Science, Engineering and Technology, 2006, retrieved on Jan. 3, 2011 from <<http://www.waset.org/journals/waset/v17/v17-24.pdf>>, pp. 123-128.
"AdWords: How does Load Time affect my Landing Page Quality?" retrieved on Jan. 3, 2011, at <<http://adwords.google.com/support/aw/bin/answer.py?answer=87144>>, 2 pages.
"Akamai Reveals 2 Seconds as the New Threshold of Acceptability for eCommerce Webpage Response Times," Sep. 14, 2009 Pres Release, retrieved from <<http://www.akamai.com/html/about/press/releases/2009/press_091408.html>>, 2 pages.

(Continued)

*Primary Examiner* — Kyle Stork
(74) *Attorney, Agent, or Firm* — Dan Choi; Judy Yee; Micky Minhas

(57) ABSTRACT

Techniques for generating, updating, and transmitting a structure-based data representation of a document are described herein. The structure-based adaptive document caching techniques may effectively eliminate redundancy in data transmission by exploiting structures of the document to be transmitted. The described techniques partitions a document into a sequence of structures, differentiate between cache-worthy structures and cache-unworthy structures, and generating a structure-based data representation of the document. The techniques may transmit updated structures and instructions, instead of all data of the document, to update previously cached structures at a client device; thereby resulting in higher cache hit rates.

20 Claims, 7 Drawing Sheets

(56) References Cited

OTHER PUBLICATIONS

Anand et al., "SmartRE—An Architecture for Coordinated Network-Wide Redundancy Elimination," SIGCOMM'09, Aug. 17-21, 2009, Barcelona, Spain, (c) 2009, retrieved at <<http://pages.cs.wisc.edu/~akella/papers/sigcomm228-anand.pdf>>, 12 pages.

Banga et al., "Optimistic Deltas for WWW Latency Reduction," 1997 USENIX Technical Conference, retrieved at <<http://reference.kfupm.edu.sa/content/o/p/optimistic_deltas_for_www_latency_reduct_250582.pdf>>, 15 pages.

"Best Practices for Speeding Up Your Web Site," retrieved on Jan. 3, 2011 at <<http://developer.yahoo.com/performance/rules.html>>, 13 pages.

Cascading Style Sheets Level 2 Revision 1 (CSS 2.1) Specification, W3C Working Draft Dec. 7, 2010, retrieved at on Jan. 3, 2011 at <<http://www.w3.org/TR/CSS2/>>, 22 pages.

Chae et al., "Silo, Rainbow, and Caching Token: Schemes for Scalable, Fault Tolerant Stream Caching," IEEE Journal on Selected Areas in Communication, vol. 20, No. 7, Sep. 2002, retrieved from <<http://ieeexplore.ieee.org/stamp/stamp.jsp?tp=&arnumber=1031905>>, pp. 1328-1344.

Chan et al., "Cache-based Compaction—A New Technique for Optimizing Web Transfer," (c) 1999 IEEE, retrieved from <<http://www.comp.nus.edu.sg/~chanmc/papers/infocom99-npact.pdf>>, 9 pages.

Delco et al., "xProxy—A Transparent Caching and Delta Transfer System for Web Objects," (c) 2000, retrieved at <<http://reference.kfupm.edu.sa/content/x/p/xproxy_a_transparent_caching_and_delta_304719.pdf>>, 15 pages.

Douglis et al., "Application-specific Delta-encoding via Resemblance Detection," Published in 2003 USENIX Annual Technical Conference, retrieved at <<http://www.research.ibm.com/people/i/iyengar/usenix03.pdf>>, 14 pages.

Fielding et al., "Hypertext Transfer Protocol—HTTP/1.1," (c) 1999 The Internet Society, retrieved at <<http://www.w3.org/Protocols/HTTP/1.1/rfc2616.pdf>>, 114 pages.

GNU WGet, retrieved on Jan. 3, 2011, at <<http://www.gnu.org/software/wget/>>, 1 page.

Google, "Using site speed in web search ranking," retrieved on Jan. 3, 2011 at <<http://googlewebmastercentral.blogspot.com/2010/04/using-site-speed-in-web-search-ranking.html>>, 52 pages.

House et al., "A System for Optimizing Web Browsing in a Wireless Environment," Second Annual International Conference on Mobile Computing and Networking—MOBICOM, 1996, retrieved at <<http://www.cis.upenn.edu/~lee/98cis640/Lectures/as3.ps.gz >>, 26 pages.

HTML Parser, Last published: Sep. 17, 2006, retrieved on Jan. 3, 2011 at <<http://htmlparser.sourceforge.net/>>, 2 pages.

Li et al., "Freshness-driven Adaptive Caching for Dynamic Content," Proceedings of the Eighth International Conference on Database Systems for Advanced Applications (DASFAS'03), Mar. 2003, retrieved from <<http://ieeexplore.ieee.org/stamp/stamp.jsp?tp=&arnumber=1192384>>, 10 pages.

Mickens, "Silo: Exploiting JavaScript and DOM Storage for Faster Page Loads," Proceeding WebApps '10 Proceedings of the 2010 USENIX Conference on Web Application Development, (c) 2010, retrieved at <<http://www.usenix.org/event/webapps10/tech/full_papers/Mickens.pdf>>, 12 pages.

Mogul et al., "Design, Implementation, and Evaluation of Duplicate Transfer Detection in HTTP," First Symposium on Network Systems Design and Implementation, Mar. 29-31, 2004, San Francisico, CA, (d) Hewlett-Packard Company 2004, retrieved at <<http://www.hpl.hp.com/techreports/2004/HPL-2004-29.pdf>>, 15 pages.

Muthitacharoen, "A Low-bandwidth Network File System," Proceedings of the eighteenth ACM Symposium on Operating Systems Principles, (c) 2001, ACM SIGOPS Operating Systems Review, vol. 35 Issue 5, Dec. 2001, retrieved at <<http://pdos.csail.mit.edu/papers/lbfs:sosp01/lbfs.pdf>>, 14 pages.

Park et al., "Supporting Practical Content-Addressable Caching with CZIP Compression," 2007 USENIX Annual Technical Conference, retrieved at <<https://db.usenix.org/events/usenix07/tech/full_papers/park/park.pdf>>, pp. 185-198.

Psounis, "Class-based Delta-encoding: A Scalable Scheme for Caching Dynamic Web," Proceedings of the 22nd International Conference on Distributed Computing Systems Workshops (ICDCSW'02), retrieved from <<http://ieeexplore.ieee.org/stamp/stamp.jsp?tp=&arnumber=1030866>>, pp. 1-7.

Rabin, "Fingerprinting by Random Polynomials," Cambridge, Mass.: Center for Research in Computing Techn., Aiken Computation Laboratory, (c) 1981, retrieved at <<http://www.xmailserver.org/rabin.pdf>>, 14 pages.

Rhea et al., "Value-Based Web Caching," in Proceedings of the Twelfth International World Wide Web Conference, May 2003, retrieved at <<http://www.srhea.net/papers/www2003-rlb.pdf>>, pp. 1-10.

Santos et al., "Increasing Effective Link Bandwidth by Suppressing Replicated Data," Proceedings of the USENIX Annual Technical Conference (No. 98) New Orleans, Louisiana, Jun. 1998, retrieved at <<http://www.usenix.org/publications/library/proceedings/usenix98/full_papers/santos/santos.pdf>>, 13 pages.

Savant et al., "Server-Friendly Delta Compression for Efficient Web Access," SpringerLink, Web Content Caching and Distribution, 2004, retrieved at <<http://cis.poly.edu/suel/papers/http.pdf>>, 12 pages.

"Shopzilla Site Redesign: We Get what we Measure," Jun. 23, 2009, retrieved from <<http://www.google.co.uk/url?sa=t&source=web&cd=5&ved=0CDsQFjAE&url=http%3A%2F%2Fassets.en.oreilly.com%2F1%2Fevent%2F29%2FShop-zilla's%2520Site%2520Redo%2520-%2520You%2520Get%2520What%2520You%2520Measure%2520Presentation.ppt&ei=D4MhTZx8zpiFB_nOobcO&usg=AFQjCNH67oo_FNul8GZkxA30Te7AuyUS_w>>, 23 pages.

The HTTP Distribution and Replication Protocol, Submitted to W3C Aug. 25, 1997, retrieved on Jan. 3, 2011 at <<http://www.w3.org/TR/NOTE-drp-19970825>>, 14 pages.

Zeng et al., "Efficient Web Content Delivery Using Proxy Caching Techniques," IEEE Transactions on Systems, Man and Cybernetics—Part C: Applications and Reviews, vol. 34, No. 3, Aug. 2004, retrieved from <<http://ieeexplore.ieee.org/stamp/stamp.jsp?tp=&arnumber=1310442>>, pp. 270-280.

* cited by examiner

```
<html>
    ...,
    IDₖ { Var₀: <img src="new_logo.jpg" ...>
          Var₁: <a id="adv1" href="http:// ...">ADV1</a>
                <br/>
                <a id="adv2" href="http:// ....">ADV2</a>
          Var₂: <img src="http ...." ...>)},
    ...
</html>
<!-- Fragments#
...
IDₖ: IDᵢ[0 , length1]
     #Var#
     IDᵢ[length1 , length2]
...
#End of fragment-->
```

702 → (pointing to `Var₂: <img src="http ...." ...>)`)

FIG. 7

STRUCTURE-BASED ADAPTIVE DOCUMENT CACHING

BACKGROUND

When surfing the Internet, users expect to load and view documents including web pages in a short period of time. Fast-loading websites provide high user satisfaction. In addition, some Internet service providers charge fees based on amount of data transmission. Eliminating redundancy in data transmission can reduce page loading time and reduce fees charged based on data traffic.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the present disclosure.

The present disclosure describes techniques for structure-based adaptive document caching that takes advantage of structures of a document to eliminate redundant data transmission over a network. The described techniques generate a structure-based data representation the document. For example, the techniques may analyze characteristics of different portions of the document based on monitoring changes of different portions of the document over a period of time, and partition the document into a sequence of structures. Each of the sequence of structures includes one or more data sets in the document. Such characteristics may include lifespans, types of data, relationships, levels of sharing in one document or multiple documents. In one embodiment, the structures may be classified into cache-worthy structures and cache-unworthy structures. One or more independently cacheable groups of data in the cache-worthy structures and cache-unworthy structures may be cached. An independently cacheable group of data may be a cache-worthy structure or a fragment resulting from partitioning a cache-unworthy structure or a cache-worthy structure.

In general, contents in the cache-worthy structures as a whole are worth caching. There are some cases that the contents with same characteristics of cache-worthy structures such as long lifespans but are not classified as cache-worthy structures since the costs outweighs the benefits when they are cached. For example, when a size of a stable structure is lower than a threshold, the seemingly cache-worthy structure may be merged into adjacent cache-unworthy structures, and thus would not be cached.

In general, contents in the cache-unworthy structures as a whole are not worth caching. There are some exceptions that the contents in the cache-unworthy structures may still be cached when the benefits outweighs the costs. For example, a cache-unworthy structure might contain some portions of contents that are reused subsequently or at a different document and thus might still be worth caching after the cache-unworthy structure is partitioned into different portions.

The classification of the cache-worthy structures and cache-unworthy structures are at least partly based on the characteristics. For example, if a structure's expected lifetime is longer than a threshold, then it may be classified as a cache-worthy structure and worth caching. Otherwise, it may be a cache-unworthy structure and generally does not worth caching. In addition to the lifespan characteristic, some other characteristics may also be used to find the cache-worthy structures. For example, a structure whose lifespan is less than the threshold may still be classified as a cache-worthy structure if the structure is shared by multiple documents and thus might be still worth caching.

In some embodiments, the cache-unworthy structure may locate between the cache-worthy structures. Alternatively, the cache-unworthy structure may locate inside a cache-worthy structure which contains a reference to the cache-unworthy structure. The number, size, and contents of the cache-worthy structures and the cache-unworthy structures in the document are dynamic and may change along with change of the document. The classification of a structure into the cache-worthy structure or the cache-unworthy structure is also dynamic and may change, for example, when the criteria to differentiate cache-worthy or cache-unworthy structure changes.

In one embodiment, the structure-based data representation may represent the document by a sequence of identifications for the cache-worthy structures, which may contain references for the cache-unworthy structures, and cache-unworthy structures. The identification may be unique for each cache-worthy structure. When there is a change of a cache-worthy structure, its identification also changes. Thus the techniques allow comparison of identifications to find out if another party has a given structure or not without the need to send the content of the structure, and can locate and transmit the updated cache-worthy structure without transmitting the other unchanged structures. The reference(s) of the cache-unworthy structures may be identical as the techniques would generally transmit the cache-unworthy structures. The reference(s) of the cache-unworthy structures may act as a placeholder to indicate a location of each cache-unworthy structure.

When a cache-unworthy structure locate inside a cache-worthy structure, the described techniques may also replace the cache-unworthy structure with a reference to indicate locations of the cache-unworthy structures so that the reference and the neighboring structure together form the cache-worthy structure. Thus a mere change of contents in such cache-unworthy structure would not influence stability of the cache-worthy structure.

In some embodiments, the described techniques may monitor and track changes of structures, and adapt to their changes by merging, splitting, and/or modifying one or more structures to reflect an update of the document.

An example of the document is a web page and the disclosed techniques may exploit hypertext markup language (HTML) structures of the web page to generate the structure-based data representation of the web page.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 7 illustrates an example update of the structure-based data representation of the inlined web page.

DETAILED DESCRIPTION

Overview

Figure 1:
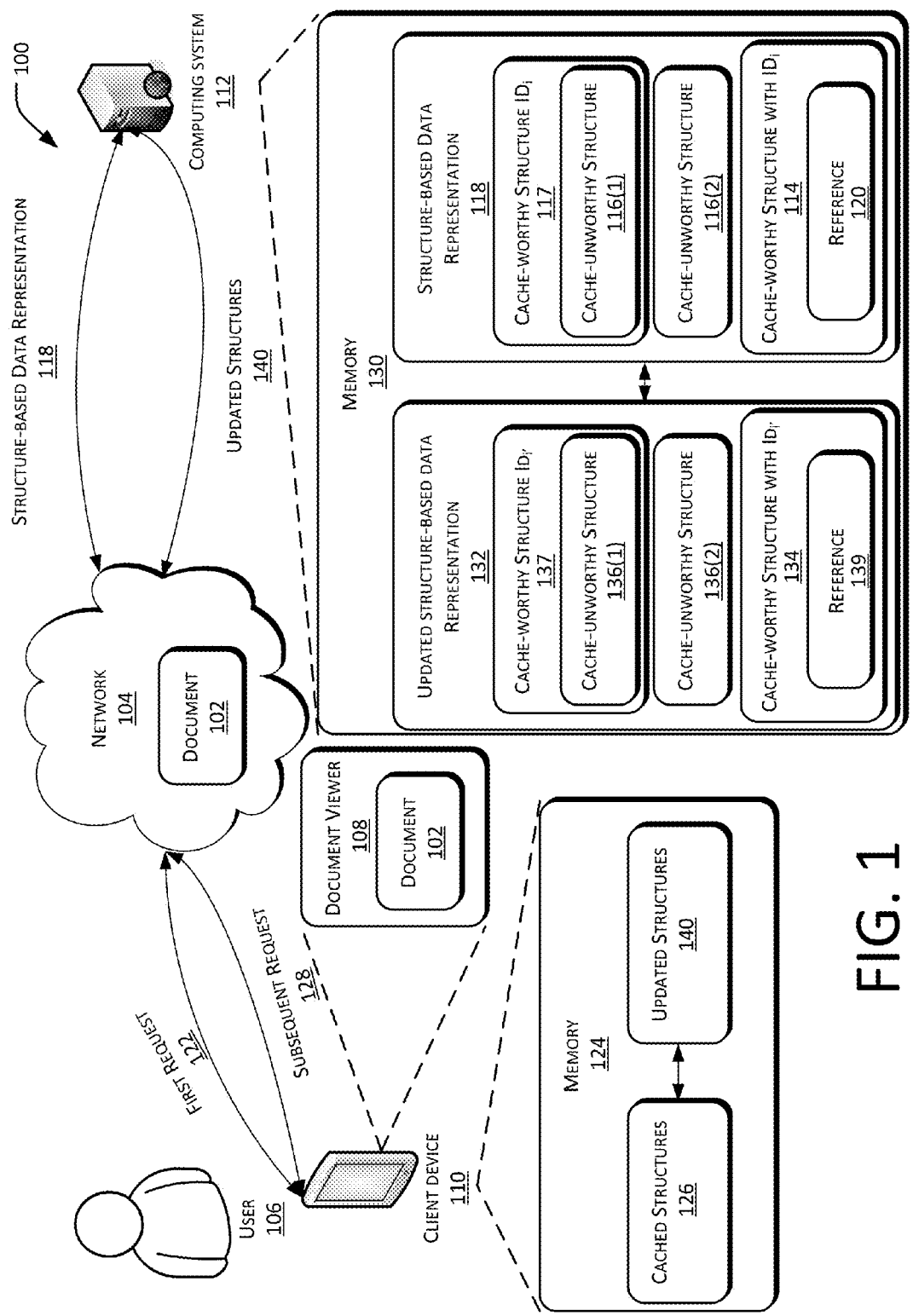
FIG. 1 illustrates an example overview of a structure-based adaptive document caching scheme.

The techniques described herein analyze different portions of a document, identify a plurality of structures of the document at least partly based on one or more of their characteristics, classify the plurality of structures into one or more cache-worthy structures and one or more cache-unworthy structures, and generate a structure-based data representation of the document. The one or more characteristics of a structure may include a lifespan of the structure, a type of data contained in the structure, a relationship of the structure with another structure, or a level of sharing of the structure with another structures. In addition to comparing characteristics of the structure with another structure in the document, the techniques may also compare characteristics of the structure in the document with structures in another document. Each of the plurality of structure may have its own lifespan. There may be a spectrum of lifespans for the plurality of structures.

The techniques may further adjust the structures so that structures with same or similar characteristics are placed into one structure. Such adjustment includes merging, splitting, and/or modifying one or more of the plurality of the structures. The plurality of the structures may change along with a change of the document. The classification of the cache-worthy structure and the cache-unworthy structure may also change over the time. The techniques may also adjust the structures and the structure-based data representation of the document when the document changes.

For caching purpose, the plurality of structures may be classified into two groups at least partly based on the one or more characteristics: cache-worthy structures and cache-unworthy structures. A selection of one or more of the characteristics and a weight of each characteristic in the selection to classify the cache-worthy structures and cache-unworthy structures may be preset and/or adjusted. The cache-worthy structures are structures as a whole worthy caching at a client device that retrieves the document from a computing system hosting the document. The benefits to cache the cache-worthy structures outweigh the cost in general. For example, one or more of the cache-worthy structures may be portions of the document whose lifespans are longer than a threshold period of time and are expected not to change for a certain period of time in the future. For another example, one or more of the cache-worthy structures are structures shared by multiple documents although their lifespans are shorter than the threshold. If such structures are shared with other documents, they may be cached so that they will not be downloaded to the client device to respond to a request of one of the other documents, although such structures may be changed in a subsequent request of the current document. The cache-unworthy structures are structures as a whole not worthy caching at the client device. For example, the cache-unworthy structures may be portions of the document whose lifespans are not longer than the threshold of time and are expected to change when the document is revisited by the client device in the future. In some cases, a cache-unworthy structure may not be worth being cached as a whole, but some portions of contents in the cache-unworthy structure may still be worth being cached if such portions are reused subsequently or at a different document after the cache-unworthy structure is partitioned into different portions.

In one embodiment, the client device may only cache the cache-worthy structures. In another embodiment, the client device may also cache one or more portions of the cache-unworthy structures when the benefits outweigh the costs. For example, if a size of a cache-unworthy structure is larger than a threshold and a portion of the cache-unworthy structure may be reusable, the client device may still cache the portion of the cache-unworthy structure. In yet another embodiment, one or more of the cache-worthy structures may be merged into adjacent cache-unworthy structures under certain circumstances. For example, a cache-worthy structure whose size is less than a threshold might be merged into an adjacent cache-unworthy structure. Such cache-worthy structure is not reflected in the structure-based data representation and is not cached.

It is appreciated that the number and contents of the structures may change according to a change of the document. For example, former cache-worthy structures may become cache-unworthy structures and vice versa, and one or more former cache-worthy and cache-unworthy structures may be merged, split, modified, or deleted according to an analysis of current contents of the document.

Such classification between cache-worthy and cache-unworthy structures in the structure-based data representation would greatly reduce the transmission time of the document over a period of time.

The structure-based data representation of the document may use a plurality of unique identifications to represent cache-worthy structures and one or more references to point to the cache-unworthy structures. In one embodiment, the reference may act as a placeholder of the cache-unworthy structures in the structure-based data representation, and be identical for each cache-unworthy structure. Thus a mere change of contents of the cache-unworthy structure would not change the reference and thus would not change the structure-based data representation.

When the client device retrieves the document at a first time, the computing system sends the structure-based data representation along with instructions to the client device. The instructions instruct a machine such as the client device how to reconstruct the document based on the received structures. The client device reconstructs and presents the document based on the received structure-based data representation and instructions. The client device also caches the cache-worthy structures and, as the case may be, one or more portions of contents in one or more cache-unworthy structures. The instructions may be embedded into and part of the structure-based data representation or be separate from the structure-based data representation. In one embodiment, the instructions are executable code such as JavaScript code when the document is a web page. In this case, the tasks that the instructions instruct the client device to do would be performed by the embedded executable code, and there is no change on the client device side in order to implement the techniques described here.

When the client device sends a subsequent request to retrieve the document again, the client device sends identifications of cached structures at the client device to the computing system. The computing system compares the identifications of cached structures at the client device with identifications of cache-worthy structures in a current structure-based data representation of the document which might be updated since last access by the client device. The computing system might not need to send the whole document to the client device. Instead, the computing system may just send the updated structures, if there are any, with possibly their identifications, and instructions to the client device. The client device reconstructs the document based on the received updated structures, instructions, and prior cached structures in its memory. The instructions may instruct the client device to merge, split, modify, or delete the prior cached structures to reflect the updated structures. In one embodiment, the instructions are embedded executable code so that there is no change on the client device side to support the techniques described herein.

Structure-Based Adaptive Document Caching Scheme

FIG. 1 illustrates an example overview 100 of a structure-based adaptive document caching scheme.

Within the illustrated environment, a document 102 is available over a network 104 to be viewed or retrieved by a user 106 through a document viewer 108 at a client device 110. A computing system 112 analyzes characteristics of different portions of the document 102, identifies a plurality of structures in the document 102, classifies the plurality of structures into one or more cache-worthy structures and cache-unworthy structures, such as a cache-worthy structure with identification $ID_i$ 114 and cache-unworthy structures 116(1) and 116(2), and generates a structure-based data representation 118 of the document 102. The computing system 112 may be the same as, or independent from, the computing system acting as a server that hosts the document 102.

The document 102 may be any document. For example, the document may be a web page, a word processing document, a spreadsheet document, or a portable document format (PDF) document. The document 102 may include a single file, such as a text document. The document 102 may also include multiple files that are incorporated together to present the document 102.

In the example of FIG. 1, for illustration purpose, the structure-based data representation 118 only shows the cache-worthy structure with $ID_i$ 114 and the cache-unworthy structures 116(1) and 116(2). In other examples, the structure-based data representation 118 may contain none to a plurality of cache-worthy structures and/or also none to a plurality of cache-unworthy structures.

In the example of FIG. 1, the contents of the cache-unworthy structure 116(1) locate within the cache-worthy structure with $ID_i$ 114 in the document 102. Thus, in the structure-based data representation 118, the cache-worthy structure with $ID_i$ 114 is replaced by its identification $ID_i$ in block 117, and the cache-unworthy structure 116(1) contained inside the cache-worthy structure with $ID_i$ 114 is placed with the identification block 117. A reference 120 inside the cache-worthy structure with $ID_i$ 114 indicates the location of the cache-unworthy structure 116(1) inside the cache-worthy structure with $ID_i$ 114. Block 116(2) represents the cache-unworthy structure 116(2) outside any cache-worthy structures. During reconstruction from the structure-based data representation to restore the original representation of the document 102, identification block 117 is replaced by its corresponding cache-worthy structure with $ID_i$ 114, and the reference 120 inside the cache-worthy structure with $ID_i$ 114 is replaced by the cache-unworthy structure 116(1) associated with the identification block 117. In some other embodiments, the cache-worthy structures and cache-unworthy structures may have different location relationships.

The cache-worthy structure 114 may act as a stable container to contain the cache-unworthy structure 116(1). Once the cache-unworthy structure 116(1) is replaced by its reference 120, the whole structures of the cache-worthy structure 114 may be repeatedly used. The data of the cache-worthy structure 114 are expected not to change within a period of time. In the structure-based data representation 118, the cache-worthy structure with $ID_i$ 114 does not include the data of the cache-unworthy structure 116(1) and only uses the reference 120 to point to data of the cache-unworthy structure 116(1). The reference 120 remains the same even when the content of the cache-unworthy structure 116(1) changes. Thus a change of data in the cache-unworthy structure 116(1) would not change the representation of the cache-worthy structure 114 in the structure-based data representation 118. The data of the cache-unworthy structure 116(1) are appended after the identification block 117 of the cache-worthy structure 114, and indicated that the cache-unworthy structure 116(1) is associated with the identification block 117.

The structure-based data representation 118 of the document 102 can effectively reduce redundant data during data transmission between the computing system 112 and the client device 110. When the client device 110 has already cached the cache-worthy structure 114, only the structure-based data representation containing the identification block 117 and cache-unworthy structures 116(1) and 116(2) are sent to the client. The content of the cache-worthy structure with $ID_i$ 114 and the reference 120 contained inside it are not sent. This leads to a reduction of data to be transmitted.

In one example, a collision-free hash function may be used to generate the identification 117 of the cache-worthy structure with $ID_i$ 114. In another example, shingles may be used to generate the identification 117 of the cache-worthy structure with $ID_i$ 114. The identifications of the cache-worthy structures can be uniquely generated by different parties, such as different computers in the computing system 110 when the computing system 110 is a distributed system. The identifications are used to exchange among different parties without exchanging the contents of the structures. By comparing the identification received from another party, one party can determine what structure the other party has.

As shown in FIG. 1, in one embodiment, the computing system 112 receives a first request 122 of the document 102 from the client device 110 and, in response, transmits the structure-based data representation 118 to the client device 110. In another embodiment, the data sent to the client device 110 includes instructions (not shown in FIG. 1) that instructs how to reconstruct the document 102 based on the structure-based data representation 118. The instructions may be part of or separate from the structure-based data representation 118. In yet another embodiment, the instructions are executable code that the client device 110 may execute to reconstruct the document 102 from its structure-based data representation 118. This approach would not require any change on the side of the client device 110 to support the structure-based data representation 118. The client device 110 reconstructs the document 102 according to the structure-based data representation 118 and the instructions, and processes the document 102 and presents the document 102 to the user 106 through the document viewer 108 such as a web browser.

The client device 110 may also cache one or more structures in its memory 124. In one embodiment, such cached structures 126 may include cache-worthy structures such as the cache-worthy structure 114. A cache-unworthy structure as a whole such as 116(1) or 116(2) is not cached in general since it is expected to change before a subsequent request 128 of the document 102 from the client device 110.

In another embodiment, the client device 110 may also cache one or more portions of one or more of the cache-unworthy structures, such as the cache-unworthy structure 116(2), when the client device 110 or the computing system 112 determines that such portions in the cache-unworthy structure 116(2) may be reusable although the whole cache-unworthy structure 116(2) may not worth caching. For example, when a size of the cache-unworthy structure 116(2) exceeds a preset threshold, and certain portions of the cache-unworthy structure 116(2) may still be reusable, although the cache-unworthy structure 116(2) as a whole may have changed before the subsequent request 128 of the document 102. In this case, the cache-unworthy structure 116(2) may be partitioned into fragments, and the client device 110 may cache the reusable fragments of the cache-unworthy structure 116(2) to reduce data to be transmitted responding to the subsequent request 128.

When the client device 110 sends the subsequent request 128 to the computing system 112 to request the document 102, the client device 110 may check which cached structures 126 are stored in the memory 124 at the client device 110 and/or whether the cached structures 126 are expired. The subsequent request 128 may include identifications of unexpired cached structures 126 at the memory 124, such as the identification of the cache-worthy structure 114.

The computing system 112 or the client device 110 may establish an expiration time of the structure-based data representation 118. Once the expiration time of the structure-based data representation 118 expires, the client device 110 or the computing system 112 would delete cached data relating to the structure-based data representation 118, including the cache-worthy structure 114, from its memory respectively no matter whether such data change or not.

The computing system 112 or the client device 110 may also establish distinctive expiration time for each of independently cacheable data. In one embodiment, an independently cacheable data set can be a cache-worthy structure 114. In another embodiment, an independently cacheable data set can be a cache-worthy structure 114 or a reusable fragment (not shown in FIG. 1) of a partitioned cache-unworthy structure, such as the cache-unworthy structure 116(2). Once the expiration time of a cached unit expires, the client device 110 or the computing system 112 would delete the cached data of that unit.

For instance, the expiration time of the cache-worthy structure 114 may be set as two weeks and the expiration time of another cache-worthy structure (not shown in FIG. 1) may be set to a greater or lesser amount of time. After the expiration time of the cache-worthy structure 114, the client device 110 or the computing system 112 may delete the cache-worthy structure 114 from its memory 124 or memory 130 respectively. Thus the client device 110 would not send the identification of the expired cache-worthy structure 114 to the computing system 112. The computing system 112 then determines that the client device 110 does not have the cache-worthy structure 114 in its memory 124, and resends the cache-worthy structure 114 to the client device 110, no matter the expired cache-worthy structure 114 can be reused or not.

In the example of FIG. 1, when the computing system 112 receives the subsequent request 128 including the identifications of the cached structures 126 at the client device 110, the computing system 112 may determine based on the received identifications what the client device 110 has in its memory 124 and what the client device 110 does not have for the document 102.

The computing system 112 checks whether there have been any changes of the document 102 since the first request 122. In one embodiment, the computing system 112 may periodically check a change of the document 102. In another embodiment, the computing system 112 may check the change of the document 102 only when receiving the subsequent request 128. In an event that there are any changes of the document 102, the computing system 112 may generate an updated structure-based data representation 132 of the document 102 and save it in the memory 130.

The updated structure-based data representation 132, in the example of FIG. 1, includes a cache-worthy structure identification $ID_{i'}$ 134 which contains a reference 139 indicating a location of a cache-unworthy structure 136(1) inside the cache-worthy structure 134. The cache-worthy structure 134 is replaced by its identification $ID_{i'}$, i.e., block 137, in the structure-based data representation 132 and the cache-unworthy structure 136(1) contained inside the cache-worthy structure 134 is appended after and indicated associated with the identification $ID_{i'}$, i.e., block 137. FIG. 1 also shows another cache-unworthy structure 136(2) outside any cache-worthy structure that is also contained in the updated document.

Upon receiving the subsequent request 112 together with null or a set of identifications of the cached structures 126 at the client device 110, in one embodiment, the computing system 112 compares the received identifications of cached structures 126 with the identifications of cache-worthy structures in the current, i.e., updated structure-based data representation 132 of the updated document 102. In another embodiment, the cached structures 126 also contain identification of reusable partitioned fragments of the cache-unworthy structure 116(2). The computing system 112 may compares the received identifications of cached structures 126 with the identifications of both cache-worthy structures and their partitioned fragments in the current, i.e., updated, structure-based data representation 132 of the updated document 102. The computing system 112 then deduces which structures have already been cached in the cached structures 126 at the client device 110 and have not been changed, and which structures in the document 102 have been changed from the cached structures 126 and should be updated at the client device 110. In the example of FIG. 1, the computing system 112 would not transmit the contents of structures with matched identifications to the client device 110. Instead, the computing system 112 transmits updated structures 140 to the client device 110.

The cache-worthy structure with $ID_{i'}$ 134 may be the same or have changed completely or partially from the prior cache-worthy structure with $ID_i$ 114. The computing system 112 may know the result by comparing their unique identifications, i.e., $ID_i$ and $ID_{i'}$.

In one embodiment, the computing system 112 maintains only one copy of the document 102 and/or one copy of the structure-based data representation of the document 102. When there is a change to the document 102, the structure-based data representation 118 is changed to the updated structure-based data representation 132 and the out-of-date structure-based data representation 118 is deleted from its memory 130. In this case, when there is any change to the structures in the cached structures 126, such changed structure would not be reusable and only the non-changed structures in the cached structures 126 may be reusable. For example, the subsequent request 128 includes the identification of cache-worthy structure 114 in the cached structures 126. If the identification of cache-worthy structure 114 is the same as the identification of cache-worthy structure 134 in the updated structure-based data representation 132, then the computing system 112 determines that there is no change to the cache-worthy structures and the cache-worthy structure 114 stored at the client device 110 is reusable. If the identification of cache-worthy structure 114 is different from the identification of cache-worthy structure 134 in the updated structure-based data representation 132, the computing system 112 instructs the client device 110 to delete the cache-worthy structure 114 and sends the cache-worthy structure 134 as a whole to the client device 110 regardless whether it is possible that a portion of the cache-worthy structure 114 is reusable.

In another embodiment, the computing system 112 may maintain both the structure-based data representation 118 and the updated structure-based data representation 132 in its memory 130. This may allow the computing system 112 to compare structures of the two versions and update the cached structures 126 via different techniques and to provide more detailed operations. In one embodiment, such a comparison is done directly by comparing the contents of structures. In another embodiment, such a comparison can be done by comparing the identifications of structures. In this case, shingles may be used as the identification of a structure and similarity of two structures' shingles indicates that there exists some similarity between the two structures. The old structures already in the cached structures 126 are used to update the old structures to the new structures. For example, such operations may include splitting a structure into two or more structures, merging two or more structures into one structure, and updating a modified structure through techniques such as delta-coding. The computing system 112 may send instructions to the client device 110 to merge, split, or modify the cache-worthy structure 114 to update it into the cache-worthy structure 134. In some embodiment, the instructions are embedded executable code that the client device 110 runs after receiving from the computing systems 112 to execute the instructions. This would not require any change on the client device 110 to support the disclosed techniques. Thus a portion of the cache-worthy structure 114 may still be reusable even if the identification of cache-worthy structure 114 is different from the identification of cache-worthy structure 134.

Different techniques may be used by the client device 110 and/or the computing system 112 to cache the cache-worthy structure 114 and portions of the cache-unworthy structure 116(1) or 116(2). For example, the client device 110 may in one embodiment cache each cache-worthy structure 114, and in another embodiment also reusable fragments of some cache-unworthy structures. This caching eliminates the need to download unchanged data by caching and reusing the data from previous visits. When there is any change of the data, the cached data may be updated with the updating information received from the server or simply invalidated when lacking of the updating information thereof. When the cached data expires, a full download of the data may be required even if the cached data may still be used in some way.

For another example, the client device 110 and/or the computing system 112 may use delta-encoding techniques to update the data cached at its respective memory to allow adaption of the cached data so that portions of unchanged contents of the cached data may be still usable and only updates to the cached data are transmitted. Delta-encoding is a coding technique that efficiently describes the evolution of data. Each version of the data is represented as a set of edits or "deltas" applied to a previous version of the data. When the client device 110 has downloaded an early version of the data, a newer version can be reconstructed by downloading the deltas from the delta-encoding of the newer version with the old version as the reference object, and combining the downloaded deltas with the old version. Downloading of the entire new version of the data is avoided, thereby resulting in less data to be downloaded.

For another example, the client device 110 may also cache one or more portions of a cache-unworthy structure when certain requirements are met, even though the cache-unworthy structure as a whole is not worth being cached. For example, the computing system 112 may partition the cache-unworthy structure 116(1) or 116(2) into fragments and allow the client device 110 to cache individual fragments when it determines that the size of the cache-unworthy structure 116(1) or 116(2) exceeds a threshold. In this case, the cache-unworthy structure is broken into smaller and contiguous fragments.

The contents of the cache-unworthy structure 116 may be updated with identifications of its fragments. Editing the cache-unworthy structure may change only a portion of the content. As a result, some fragments may be changed while other fragments may not. By partitioning the cache-unworthy structure 116 into one or more constituent bytes range, i.e., fragments, the computing system 112 needs to transmit only the fragments that have been modified. The unchanged fragments can be reused, resulting in less data to be sent to the client device 110.

Cached fragments can also be updated with different techniques. In one embodiment, delta-encoding can be used to update a fragment. The current version of a fragment can be represented as a set of edits or "deltas" applied to a previous version of the fragment. These edits may be sent to the client device 110 to update cached fragments. The unchanged portion of a changed fragment may still be used.

The client device 110 may be implemented as any one of a variety of conventional computing devices such as, for example, a desktop computer, a notebook or laptop computer, a netbook, a tablet or slate computer, a surface computing device, an electronic book reader device, a workstation, a mobile device (e.g., smartphone, personal digital assistant, in-car navigation device, etc.), a game console, a set top box, or a combination thereof. The network 104 may be either a wired or a wireless network. The configuration of the computing system 110 is discussed in detail below.

For convenience, the methods are described below in the context of the client device 110 and/or the computing systems 112 and environment of FIG. 1. However, the techniques described herein are not limited to implementation in this environment.

The disclosed techniques may, but need not necessarily, be implemented using the client device 110 and/or the computing system 112 of FIG. 1. For example, another non-illustrated computing system may perform any one of the operations herein. It is not necessary that the computing system 112 alone complete any or all of the operations to generate the structure-based data representation 118 or the updated structure-based data representation 128. The computing system 112 may or may not directly receive request from or return result to the client device 110. For example, the computing system 112 may receive the request for the document 102 and/or may return the structure-based data representation 118 through a third party.

Example methods for performing techniques described herein are discussed in details below. These example methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

The example methods are sometimes illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer executable instructions that, when executed by one or more processors, perform the recited operations.

Figure 2:
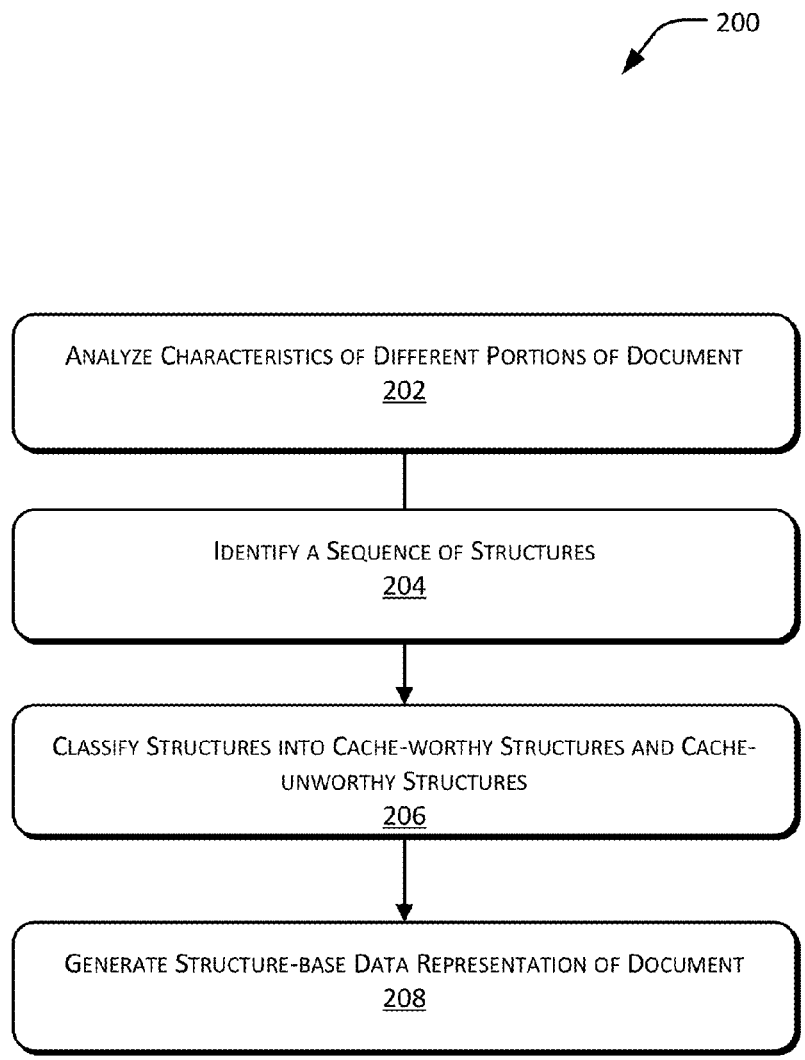
FIG. 2 illustrates an example generation of the structure-based data representation of a document.

FIG. 2 illustrates an example generation of the structure-based data representation 118 of the document 102.

At block 202, the computing system 112 analyzes characteristics of different portions of the document 102.

The characteristics may include lifespans of different portions of the document 102 over the period of time, types of data, relationships, levels of sharing of such different portions. The characteristics may also include attributes shared by the document 102 with other documents. Replacing repeated structures in a document or multiple documents with their identifications generally results in a more efficient representation of the document 102, and thus reduces the data to be transmitted.

At block 204, the computing system 112 identifies a sequence of structures at least based on the analysis of the characteristics.

The computing system 112 may consider multiple characteristics in partitioning the document 102 into a sequence of cache-worthy and cache-unworthy structures. Various techniques can be applied. For example, two or more structures with same or similar lifespan may but not necessarily be merged into one structure. Two structures may have similar lifespans but may exchange their order at some point of time, and therefore may be partitioned into two different structures. For another example, two structures with dependent relationship may but not necessarily be merged into one structure.

Various techniques may be used to identify the structures of the document 102.

In one example, the computing system 112 may determine a basic building unit of the document 102, and monitor characteristics of the basic building unit over a period of time, and group one or more basic units with same or similar characteristics into a structure. For example, when the document is a web page, a HTML unit, such as a tag surrounded by angle bracket, is a basic building unit to form the web page.

In another example, the computing system 112 may achieve this by recording and monitoring a history of the document 102, and by analyzing different versions of the document 102 during a period of time based on one or more characteristics to identify the structures. It is not necessary to find the structures starting from finding the basic building unit of the document 102.

The computing system 112 may also need to determine boundaries of the plurality of structures and of the plurality of the fragments in a cache-unworthy structure.

In one embodiment, the boundaries of the structures are aligned with the basic building units of the document. This is typically used for structured data, such as text-based data. In another embodiment, the computing system 112 may require that the boundaries of the structures or fragments meet certain requirements. For example, the computing system 112 may use Rabin fingerprint to establish boundary of one or more structures or fragments. This technique may be used for non-text-based data, such as binary data larger than a threshold.

At block 206, the computing system 112 classifies the plurality of structures into one or more cache-worthy structures, such as the cache-worthy structure 114, and one or more cache-unworthy structures, such as the cache-unworthy structure 116(1) and 116(2). The computing system 112 may partition one or more cache-unworthy structures into one or more sequences of fragments.

The cache-worthy structures are structures as a whole worthy caching at the client device 110 that retrieves the document 102 from the computing system 112 hosting the document. For example, the cache-worthy structure 114 is a structure whose lifespan is longer than a threshold period of time and is expected not to change for certain period of time in the future. The threshold period of time is a minimum period of time to differentiate the cache-worthy structure 114 and the cache-unworthy structure 116(1) or 116(2). For instance, the minimum period of time may be duration between two expected visits from the client device 110 to retrieve the document 102. Such minimum period of time may be different in different applications or settings. The cache-unworthy structure 116(1) or 116(2) is a structure as whole not worthy caching at the client device 110. For example, the cache-unworthy structure 116(1) or 116(2) is a structure whose lifespan is not longer than the threshold of time and is expected to change when the document is revisited by the client device in the future. However, certain portions of the cache-unworthy structure 116(1) or 116(2) may be reusable and the cache-unworthy structure may be partitioned to such reusable portion that the client device 110 can cache.

The structures and the classification of the cache-worthy structures and cache-unworthy structures may change along with a change of the document 102. For example, a former cache-worthy structure may become a cache-unworthy structure and vice versa when the threshold of time changes, and one former cache-worthy structure may be merged, modified, or split to reflect an updated document 102 according to an analysis of structures of the document 102 at different times.

At block 208, the computing system 112 generates the structure-based data representation 118 of the document 102 based on the one or more cache-worthy structures and one or more cache-unworthy structures.

The computing system 112 may also generate one or more instructions that instruct a machine such as the client device 110 to reconstruct and present the document based on the structure-based data representation. The instructions may be embedded into and part of the structure-based data representation or be separate from the structure-based data representation. In some embodiments, the instructions are execute code embedded in the structure-based data representation that the client device 110 runs to execute the instructions without requiring any change on the client device 110 to support the disclosed techniques.

The structure-based data representation 118 includes an identification of the cache-worthy structure 114 and the reference 120 to the cache-unworthy structures 116(1). The computing system 112 may generate such identification and reference by using different techniques.

Each independently cacheable group of data may have a unique identification. In one embodiment, an independently cacheable group of data may be a cache-worthy structure. In another embodiment, an independently cacheable group of data may be a fragment of cache-unworthy structure. The computing system 112 may partition a cache-unworthy structure over a size limit into one or a plurality of fragments to allow the client device 110 to cache one or more reusable fragments. Once a portion of the document changes, the identifications associated with the document indicate which independently cacheable groups of data have been changed. Those unchanged groups of data may be reused without retransmission. A changed group of data may be updated to the updated group of data using delta-encoding or other techniques.

In one embodiment, the computing system 112 may use collision-free hash functions to generate the unique identifications of an independently cacheable group of data. The computing system 112 may compare the hash values of two groups of data calculated with the collision-free hash function to determine if the two groups of data are identical or not. In another embodiment, the computing system 112 may also use shingles as identifications of independently cacheable groups of data in the document. The computing system 112 may calculate and compare shingles of two groups of data to determine if the two groups are identical or not, and if not identical, how similar the groups are. While any change in a group of data such as the cache-worthy structure 114 results in a completely different hash value, shingles of similar groups of data can be similar. Shingles can be used to gauge the similarity of two groups of data. A varied group of data with similar shingles may be updated from the prior group of data through delta-coding, and thus partial of data in the prior group of data may be reused.

In one embodiment, the reference 120 is an index to one or more cache-unworthy structures. The index is unique within the context of the cache-worthy structure that contains the referenced cache-unworthy structure 116(1). An index can be reused by different cache-worthy structures since the context, i.e., the cache-worthy structure that the reference is contained in, would tell them apart. Alternatively, in another embodiment, the computing system 112 uses an identical symbol as the reference to represent different cache-unworthy structures. This symbol indicates the location of a cache-unworthy structure inside the cache-worthy structure. For example, in the example of FIG. 1, the cache-unworthy structure 116(1) locate inside contents of the cache-worthy structure 114 in the document 102. The computing system 112 may replace the cache-unworthy structure 116(1) with the reference 120 in the cache-worthy structure 114, and may append the contents of the cache-unworthy structure 116(1) with the identification block 117 of the cache-worthy structure 114 in the structure-based data representation 118, as shown in FIG. 1, and with an indication of which reference in cache-worthy structure 114 is associated with the cache-unworthy structure 116(1).

In an example application scenario, the computing system 112 may be a distributed system that includes one or more machines. The collision-free hash function or shingles may ensure that different machines in the distributed system independently choose the same identification for each cache-worthy group of data such as the cache-worthy structure 114 of the document 102 or a fragment of the cache-unworthy structure 116(1) or 116(2). Different machines can thus determine whether they store the same cached groups of data of the document 102, such as the cache-worthy structure 114, by exchanging only the identifications of the groups of data instead of the data in these groups. By comparing the identifications, a peer machine may determine whether it has stored some data of the structure-based data representation 118 and also determine the same and/or similar data of the two different versions of the document 102 without the need to exchange and compare the contents of the document 102 or its structures.

Example Web Page Caching

The following is a description of an example embodiment of the disclosed techniques when the document 102 is a web page.

Figure 3:
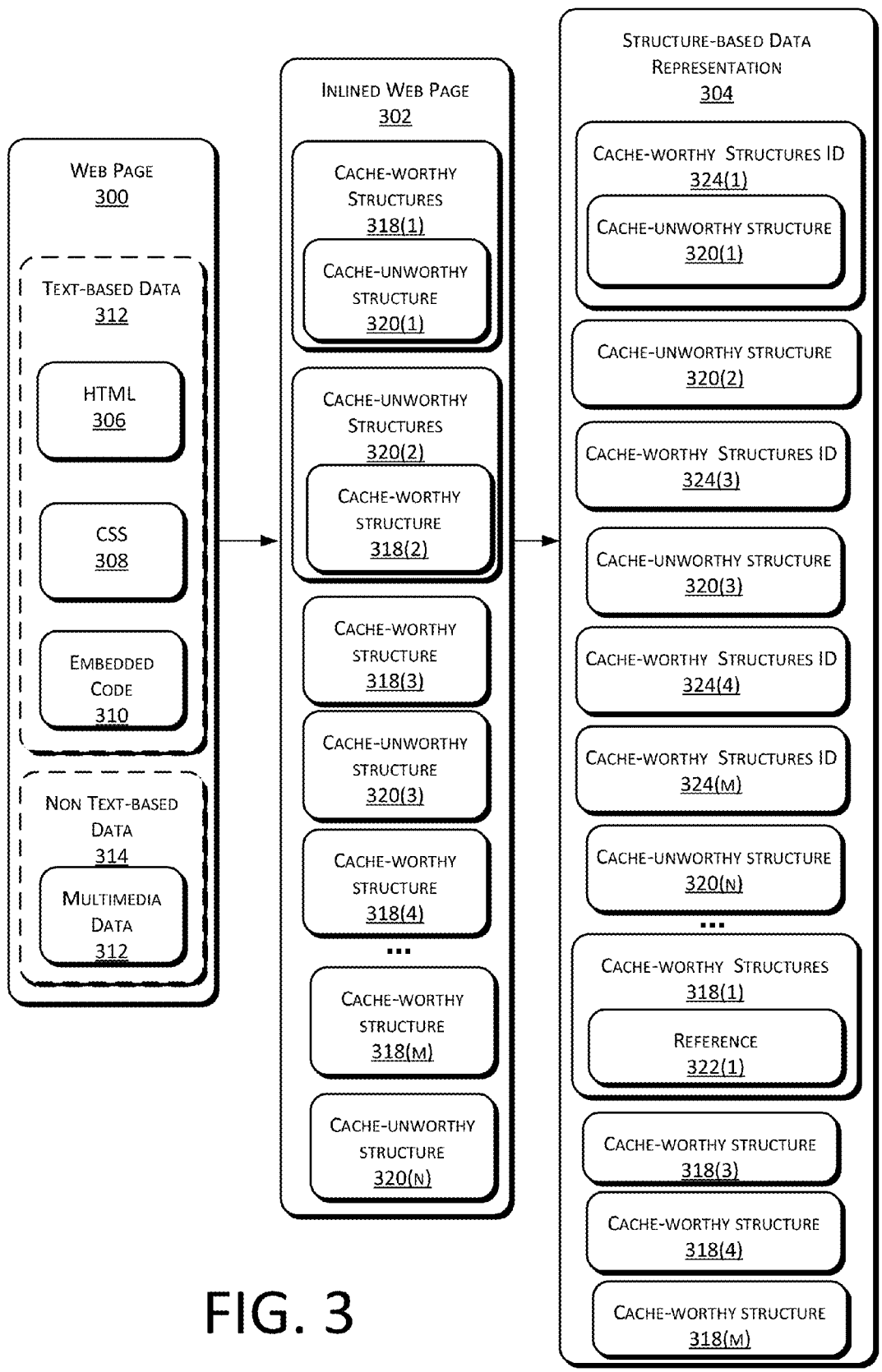
FIG. 3 illustrates components of an example web page, components of an example inlined web page based on the example web page, and components of an example structure-based data representation based on the example inlined web page.

FIG. 3 illustrates components of an example web page 300, components of an example inlined web page 302 based on the example web page 300, and components of an example structure-based data representation 304 based on the example inlined web page 302.

In the example of FIG. 3, the computing system 112 analyzes the structures of the web page 300 and obtains that the web page 300 is composed of none, one or more linked data. For example, the linked data may be multiple linked objects that form the web page 300 together. The computing system 112 may classify the multiple objects contained or linked in a web page 300 into following different classes: a HTML 306 describing a content of the web page 200, a cascading style sheet (CSS) 308 defining an appearance and a formatting of the content of the web page 300, code 310, such as JavaScript™, allowing the web page 300 to respond to user inputs and dynamically update itself, and multimedia data 312 such as image data, audio data, or video data. In one example, each object may be a separate file. Some objects may be embedded in another object. For instance, the CSS 308 or the code 310 may be embedded into the HTML 306. The code 310 may also include instructions that instruct a machine such as the client device 110 to reconstruct and present the web page 300 based on the structure-based data representation 304.

In another example, the web page 300 may include a portion of the multiple objects as shown in FIG. 3. For instance, the web page 300 may be only composed of the HTML 306.

The multiple objects of the web page 300 may have different characteristics. The computing system 112 may further classify the multiple classes into text-based data 312 and non-text-based data 314. The text-based data 312 may be structured data, and may change progressively across revisions of the objects. For example, the text-based data 312 may include the HTML 306, the CSS 308, and the code 310.

The non-text-based data 314 may be a binary object that is typically modified or changed as a whole object. The multimedia data 312 is an example of the non-text-based data 314. For instance, an advertisement banner in a form of image, as an example of the multimedia data 312 displayed on the web page 300, is usually changed to a different advertisement banner over the period of time.

In one embodiment, the computing system 112 may regard the non-text-based data 314 as one or more cache-unworthy structures, and identify cache-worthy structures only inside text-based data 312.

In another embodiment, the computing system 112 may also classify cache-worthy structures and cache-unworthy structures in the non-text-based data 314. For example, the computing system 112 may monitor changes of the non-text-based data 314 over a period of time to differentiate between the cache-worthy structures and cache-unworthy structures in the non-text-based data 314. For instance, only a portion of a picture is changed over the period of time. The computing system 112 may identify the bytes relating to changed portion of the picture as cache-unworthy structures and the bytes relating to unchanged portion of the pictures as cache-worthy structures. Alternatively, the computing system 122 may monitor changes of the non-text-based data 314 to classify a whole object of the non-text-based data 314 as either cache-worthy structures or cache-unworthy structures. For instance, the non-text-based data 314 may be a picture. Even though only a portion of the picture is changed, the computing system 112 may identify the whole picture as a cache-unworthy structure.

In the example of FIG. 3, the computing system 112 may incorporate linked data in the web page 300 to form the inlined web page 302, and then analyze structures of the inlined web page 302 to partition the inlined web page 302 into a sequence of cache-worthy structures 318(1), 318(2), . . . , 318(m) and cache-unworthy structures 320(1), 320(2), . . . , 320(n). The parameters m and n can be any integer.

The cache-worthy structures 318(m) and the cache-unworthy structures 320(n) may have various relationships in the inline web page 302. In different situations, the computing system 112 may merge, split, or modify the cache-worthy structure 318(m) and the cache-unworthy structure 320(n) to reach an efficient transmission structure in the structure-based data representation 304.

For example, the cache-unworthy structure 320(1) locates between two cache-worthy structures (not shown in FIG. 3). The two cache-worthy structures have same or similar characteristics. Thus the two cache-worthy structures may be merged together into one cache-worthy structure 318(1). The cache-worthy structure 318(1) thus includes the cache-unworthy structure 320(1).

For another example, the cache-worthy structure 318(2) is adjacent to the cache-unworthy structure 320(2). Although the cache-worthy structure is expected not to change in certain period of time, the computing system 112 may still determine that it's not worthy caching the cache-worthy structure 318(2). For instance, a size of the cache-worthy structure 318(2) does not reach a threshold and thus there is no need to cache the cache-worthy structure 318(2). The computing system may group the cache-worthy structure 318(2) into the cache-unworthy structure 320(2).

For yet another example, the cache-unworthy structure 320(3) locates between two cache-worthy structures 318(3) and 318(4). The two cache-worthy structures 318(3) and 318(4) do not have same or similar characteristics and are uncorrelated. Thus each of the two cache-worthy structures 304 and 306 is a separate structure. The cache-worthy structure 318(3) or 318(4) does not include the cache-unworthy structure 320(3).

The computing system 112 then generates the structure-based data representation 304 of the inlined web page 302 according to the cache-worthy structures and cache-unworthy structures therein.

In the inlined web page 302, the cache-worthy structure 318(2) is merged into the cache-unworthy structure 320(2). There is no need to identify the cache-worthy structure 318(2), and does not generate identification to the cache-worthy structure 318(2). In the structure-based data representation 304, all the cache-worthy structures are replaced by their identifications. The contents of cache-worthy structures are appended at the end of the structure-based data representation 304, and may be sent to a client device 110 only when they are not in the client device 110's locally cached structures 126. For example, the cache-worthy structure 318(1) is replaced by its identification 324(1). A resulting cache-unworthy structure such as 320(1) may be contained in some cache-worthy structure such as 318(1). The computing system 112 may replace the cache-unworthy structure 320(1) with a reference 322(1) in the cache-worthy structure 318(1) and append the cache-unworthy structure 320(1) to and associated with the identification 324(1) of the cache-worthy structure 318(1) in the structure-based data representation 304, as shown in FIG. 3. A resulting cache-unworthy structure such as 320(2) may not be contained in any cache-worthy structure, and thus appear independently from any cache-worthy structures in the structure-based representation 304.

In the inlined web page 302, the cache-worthy structures 318(3) and 318(4) and the cache-unworthy structure 320(3) are separate structures. Thus, each of the cache-worthy structures 318(3) and 318(4) has its own unique identification. They are replaced by their identifications 324(3) and 324(4) respectively in the structure-based data representation 304. The contents of the cache-worthy structures 318(3) and 318(4) are appended at the end of the structure-based data representation 304, and may be sent to a client device 110 only when they are not in the client device 110's locally cached structures 126.

The structure-based data representation 304 includes a sequence of unique identifications 324(1), . . . , 324(m) corresponding to a sequence of cache-worthy structures 318(1), . . . , 318(m). Each cache-worthy structure may contain none, one, or more reference(s) to a subset of the cache-unworthy structures that are included in the respective cache-worthy structure, such as the reference 322(1) referring to the cache-unworthy structure 320(1).

In the structure-based data representation 304, the cache-unworthy structure 320(1) inside a cache-worthy structure 318(1) of the document 102 is replaced by its respective reference 322(1) in the structure-based data representation 304. In one embodiment, the reference may be unique for each occurrence of a cache-unworthy structure. Alternatively, the reference may represent where a cache-unworthy structure locates and be identical for all of the cache-unworthy structures. In the structure-based data representation 304, the cache-worthy structures 318(1), . . . , 318(m), are replaced by their respective IDs 324(1), . . . , 324(m). The cache-unworthy structure 320(1) contained in the cache-worthy structure 318(1) is appended to and associated with the identifications 324(1) of the cache-worthy structure 318(1). The contents of the cache-worthy structures 318(1), . . . , 318(m) including the references 322(i) contained in them are also represented at the end of the structure-based data representation 304. A part of a whole of the cache-worthy structures may be sent to the client device 110 only when the client device 110 does not contain them in its cached structures 126.

Figure 4:
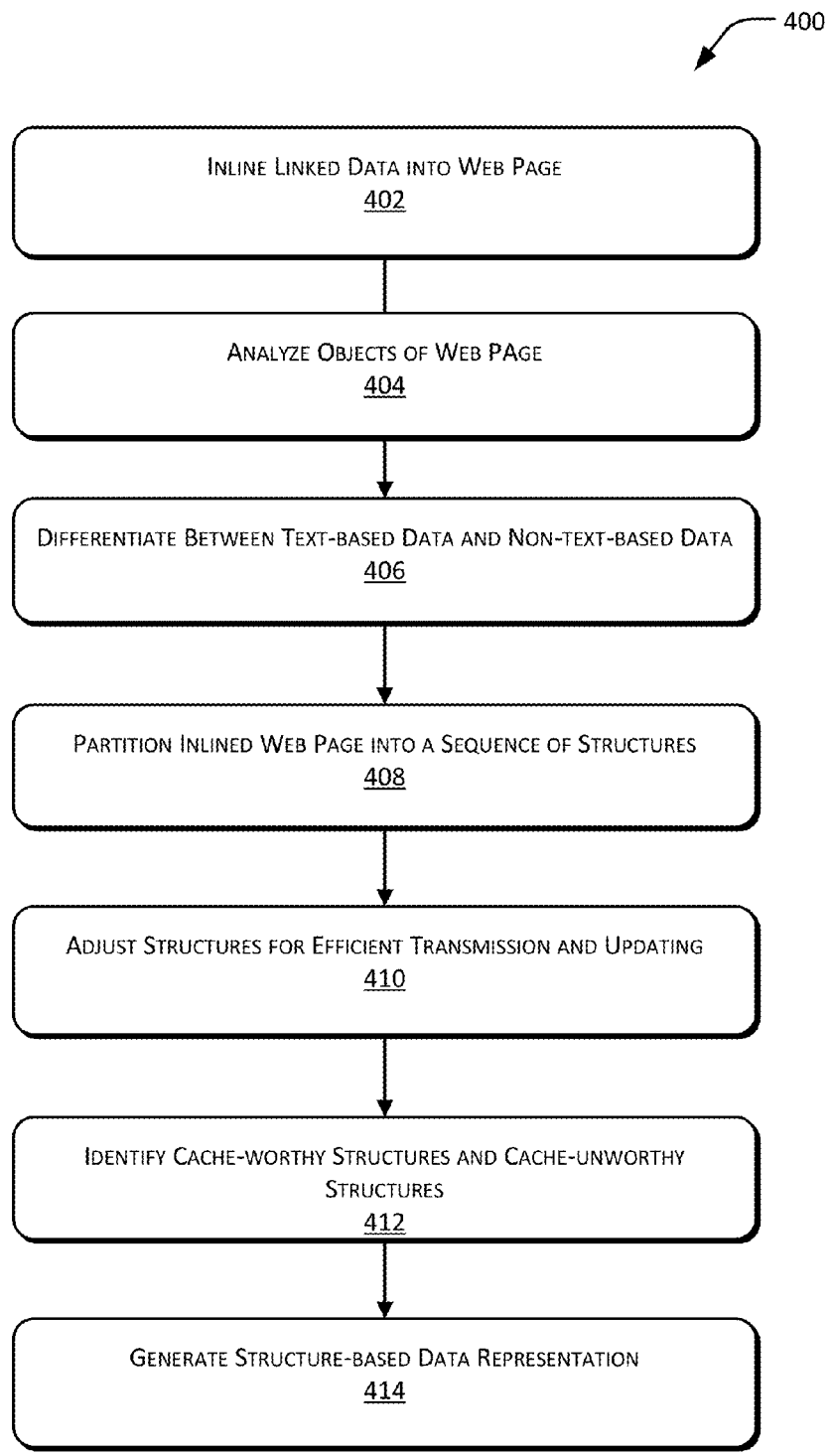
FIG. 4 illustrates a flowchart showing an example method of generating the structure-based data representation of a web page.

FIG. 4 illustrates a flowchart showing an example method 400 of generating the structure-based data representation 304 of the web page 300.

At block 402, the computing system 112 inlines the linked data, if any, into the web page 300 to form the inlined web page 302. For example, the computing system 112 may insert the CSS 308 and code 310 into the web page 300 so that the computing system 112 may deliver the web page 300 including the HTML 306, the CSS 308, and the code 310 of the web page 300 to the client device 110 in a single HTTP fetch. The inlined web page 302 may reduce a number of requests from the client device 110 for the multiple objects to construct the web page 300.

At block 404, the computing system 112 analyzes objects of the inlined web page 302. For example, the computing system 112 may obtain the objects including the HTML 306, the CSS 308, the code 310, and the multimedia data 312 as shown in FIG. 3.

At block 406, the computing system 112 differentiates between the text-based data 312 including the HTML 306, the CSS 308, and the code 310, and the non-text-based data 314 such as the multimedia data 312 of the multiple objects based on their characteristics.

At block 408, the computing system 112 partitions the inlined web page 302 into a sequence of structures based on analyzing characteristics of the structures by various techniques.

In one embodiment, the computing system 112 may firstly partition the inlined web page 302 into a sequence of basic building units. For the example of HTML 306, such a basic building unit is referred as HTML unit. The following techniques are applicable to the HTML 306 but the idea may also be applicable to other types of data, for example, the CSS 308.

For example, the HTML 306 is composed of one or more HTML elements. The HTML element is composed of three parts: a start tag, an end tag, and a content. For instance, the content may locate between the start tag and the end tag. In some instances, the HTML element may only have one or more of the tags. A tag is surrounded by angle brackets such as <html>. Each HTML element may have attributes, which are specified inside the tag. One HTML element may also be nested into another HTML element. In one embodiment, the computing system 112 may break the HTML element into smaller HTML units. The HTML unit may be the start tag, the end tag, the content, or a comment.

After identifying the basic building unit, the computing system 112 merges adjacent basic building units with same or similar characteristics, especially the characteristics related to caching, into one or more structures. For example, the computing system 112 may monitor changes of the inlined web page 302 and compare different copies collected at different times during observation to identify the lifespan of each basic building unit. The computing system 112 may then merge HTML units with same or similar lifespans into one structure.

For another example, related units that are likely to appear and change together at same or similar time are also merged into a structure. In yet another example, a sequence of basic building units that appear together in the same order in many places of the inlined web page 302 or in another web page may also be grouped into a structure.

In another embodiment, the computing system 112 does not build the structures starting from the basic building units of the inlined web page 302. The computing system 112 may collect multiple copies of the inlined web page 302 over the period of time and compare them to obtain a sequence of structures based on analyzing their characteristics.

For example, if there are N (N can be any integer) times of changes to the inlined web page 302 during the lifespan of cached data, the computing system 112 may maintain N different representations of the inlined web page 302. The computing system 112 compares the N different copies of the inlined web page 302 to obtain a sequence of structures according to the characteristics of different portions of the inlined web page 302 presented during such changes. In yet another embodiment, the boundaries of the sequence of structures may be further adjusted according to the basic building unit of the inlined web page 302.

At block 410, the computing system 112 may adjust the structures for efficient transmission of the document 300 and/or the structure-based data representation 304. Such adjustment may include adjusting the number, size, or contents of the structures.

In one embodiment, the computing system 112 may merge one or more structures into one structure. In general, structures of similar characteristics related to caching may be grouped into a single structure. A large structure may make a representation of the inlined web page 302 more efficient but may reduce caching hit rate since the data as a whole may have changed while some portion of the data may still remain the same. The unchanged portion of data, if cached, still result in a caching hit even though the data as a whole has a caching miss.

For example, the computing system 112 may merge structures that likely appear and change together, a possibility of which being larger than a threshold, into one structure. The related structures may be of dependency relationship that one structure depends on the other structure. The computing system 112 may also merge a small structure with an adjacent structure even though the characteristics of the two are not similar. For example, the size of the small structure may be less than a threshold, the computing system 112 determines that it is not efficient to cache and transmit it separately.

In one embodiment, the computing system 112 may put a constraint on a size of an independently cacheable group of data such as a cache-worthy structure in order to use a fixed number of bits to index any byte inside the group of data for efficient delta-encoding: the number of bytes in the group of data is less than a threshold $M_b$. In another embodiment, the computing system 112 may introduce an exception to this constraint when one independently cacheable group of data contains a single basic building unit, such as the HTML unit: there is no limit on the size of the independently cacheable group of data if that structure contains only one basic building unit. If $M_b$ is set as 64K bytes, then the computing system 112 may use two bytes to index any byte inside the structure. This indexing is used in delta-encoding the independently cacheable group of data should the group of data be modified.

In yet another embodiment, the computing system 112 may partition a structure whose size is larger than a threshold into multiple fragments within the limit of threshold. This is typically done on a structure composed of a binary object over a threshold number of bytes $T_b$.

Each cache-worthy structure or fragment may be cached independently. A different expiration time may be assigned to each independently cacheable group of data. The computing system 112 may monitor changes of the inlined web page 302 to determine the lifespan of each structure, and assign the expiration time of the independently cacheable group of data that matches the expected lifespan of the group of data.

At block 412, the computing system 112 identifies the cache-worthy structures 318($i$) and cache-unworthy structures 320($j$) in the sequence of structures. The parameter can be any integer between 1 and m and the parameter j can be any integer between 1 and n.

The computing system 112 thus partitions the inlined web page 302 into a sequence of cache-worthy structures 318($m$) and cache-unworthy structures 320($n$).

Different techniques may be used to identify the cache-worthy structures 318($m$) and the cache-unworthy structures 320($n$). In one embodiment, the cache-worthy structures 318($m$) and the uncache-worthy structures 320($n$) are manually identified by a person such as a web designer who designs the web page 300. The computing system 112 reads such manual identifications and then identifies cache-worthy structures 318($m$) and cache-unworthy structures 320($n$) of the inlined web page 302.

In another embodiment, the computing system 112 may use the characteristics such as the lifespans of the structures to classify whether one or more structures are the cache-worthy structures 318($i$) or the cache-unworthy structures 320($j$), where i and j can be any integer.

For example, the one or more structures with lifespans less than a threshold of time may be determined as the cache-unworthy structures 320($j$). The one or more structures with lifespans longer than the threshold of time may be determined as the cache-worthy structures 318($i$).

The threshold of time may be the duration of time between two sequential visits of the web page 300. In one example, the duration of time between two sequential visits may be determined by observing the patterns of visits of the web page 300 by different users. In another example, the duration of time between two sequential visits may be determined by modeling a behavior of the user 106.

In yet another example, the duration of time may be determined based on the lifespans of different structures. For example, the duration of time may be a median, middle, or a number calculated based on a preset algorithm of the lifespans of the different structures.

In yet another example, the duration of time may also be a preset number set by the user 106 or the computing system 112.

At block 414, the computing system 112 generates the structure-based data representation 304 based on the identified cache-worthy structures 318($i$) and cache-unworthy structure 320($j$).

Once the computing system 112 has identified the cache-worthy structures 318($i$) and cache-unworthy structure 320($j$), the computing system 112 may replace the cache-unworthy structure 320($j$) contained inside the cache-worthy structures 318($i$) with references. In some embodiments, a reference may be a special mark $U_s$ which indicates a location of the cache-unworthy structure inside the cache-worthy structure 318($i$). Each $U_s$ represents one or more cache-unworthy structures 320($j$) or a null (i.e., an empty cache-unworthy structure). These $U_s$ marks are considered identical in comparing each copy of the inlined web page 302. They remain the same even when the actual contents of the cache-unworthy structures change.

If one cache-worthy structure 318($i$) contains $U_s$, then the corresponding contents for each cache-unworthy structure inside the cache-worthy structure 318($i$) are indexed and listed after the identification of the cache-worthy structure 318($i$) in the structure-based data representation 304. An index k indicates that the corresponding cache-unworthy structure associated with k is to replace the k-th $U_s$ in the cache-worthy structure 318($i$) when the original representation of the document 102 is reconstructed from its structure-based data representation 304.

Once the cache-unworthy structure 320($j$) contained inside the cache-worthy structures 318($i$) are replaced by $U_s$, the computing system 112 may apply a collision-free hash function to each resulting cache-worthy structure to calculate its identification. Alternatively, it may calculate shingles of the resulting cache-worthy structures and use shingles as identifications of the resulting cache-worthy structures.

The computing system 112 may use the same techniques to generate a unique identification to each fragment once the computing system 112 or the client device determines to partition a large cache-unworthy structure 320($j$) into fragments, and each fragment may be cached independently.

Each cache-worthy structure is replaced by its identification, and the contents of the cache-worth structures along with the references contained inside the cache-worthy structure are appended at the end of the structure-based data representation 304. The contents of the referenced cache-unworthy structures are appended to and associated with the identifications of the cache-worthy structures which contain them. The resulting inlined web page 302 is then represented by the structured-based data representation 304 including a sequence of identifications of cache-worthy structures appended with associated cache-unworthy structures interleaved with cache-unworthy structures not contained in the cache-worthy structures. The contents of the cache-worthy structures and the references contained inside the cache-worthy structures to indicate the locations of the cache-worthy structures are appended at the end of the structure-based data representation 304.

Figure 5:
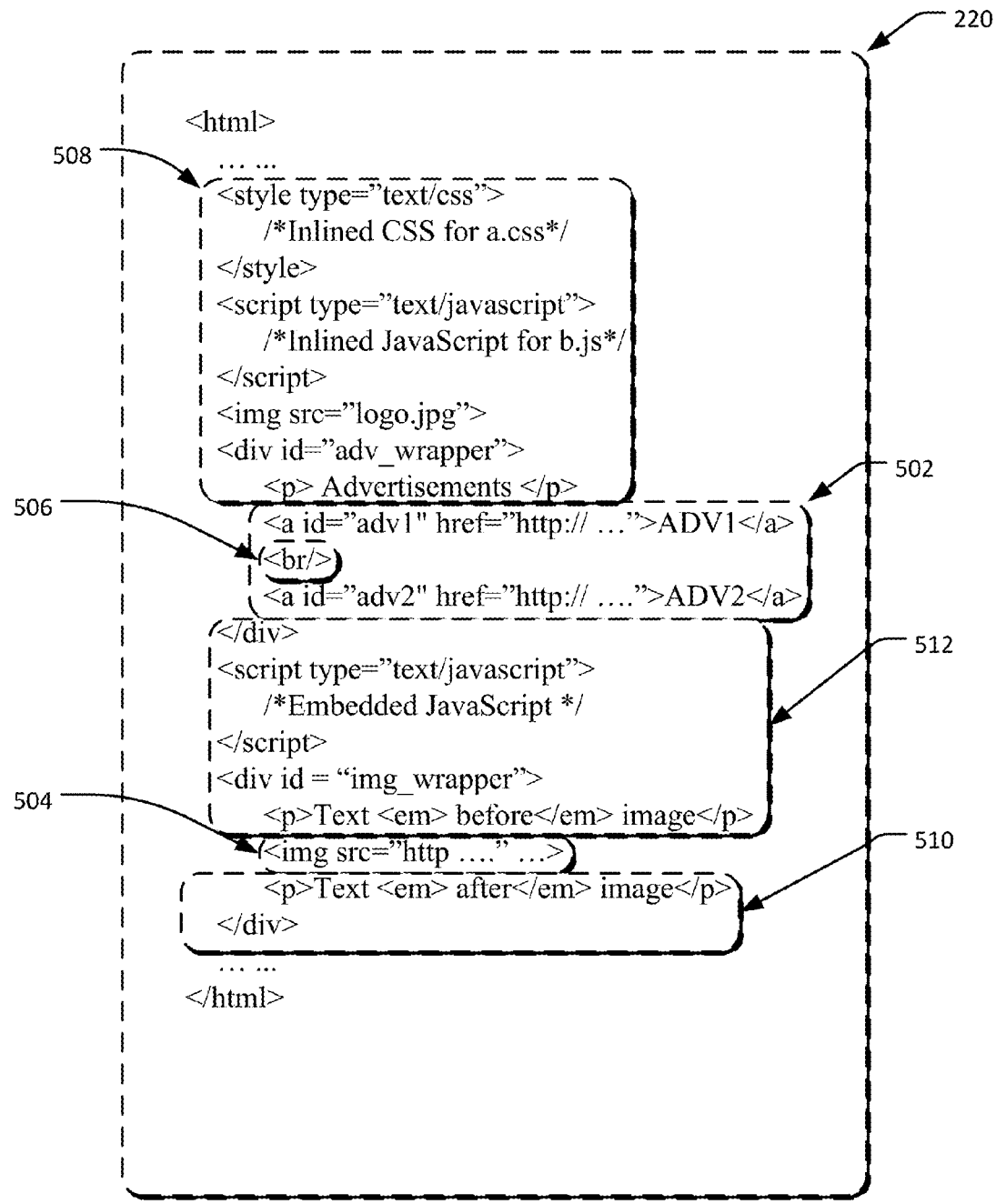
FIG. 5 illustrates an example inlined web page.

FIG. 5 shows an example inlined web page 302. In the example of FIG. 5, there are two cache-unworthy structures 502 and 504 in the inlined web page 302: the first cache-unworthy structure 502 is

```
<a id="adv1" href="http:// ...">ADV1</a>
<br/>
<a id="adv2" href="http:// ....">ADV2</a>
``` which resides in the middle of the inlined web page 200; and the second cache-unworthy structure 504 is <img src="http . . . " . . . > which is near the end of the inlined web page 302.

The first cache-unworthy structure 502 may change to different advertisements and the second cache-unworthy structure 504 may display different images. There is a cache-worthy structure "<br/>" 506 inside the first cache-unworthy structure 502. As shown in FIG. 5, the computing system 112 merges the cache-worthy structure 506 into adjacent cache-unworthy structure 402 in an event that the cache-worthy structure 506 is smaller than a threshold size. After determining the cache-unworthy structures 502 and 504, the computing system 112 may determine the three cache-worthy structures, one before the first cache-unworthy structure 502 (here, a cache-worthy structure 508), one after the cache-unworthy structure 504 (here, a cache-worthy structure 510), and the third between the two cache-unworthy structures 502 and 504 (here, a cache-worthy structure 512).

Figure 6:
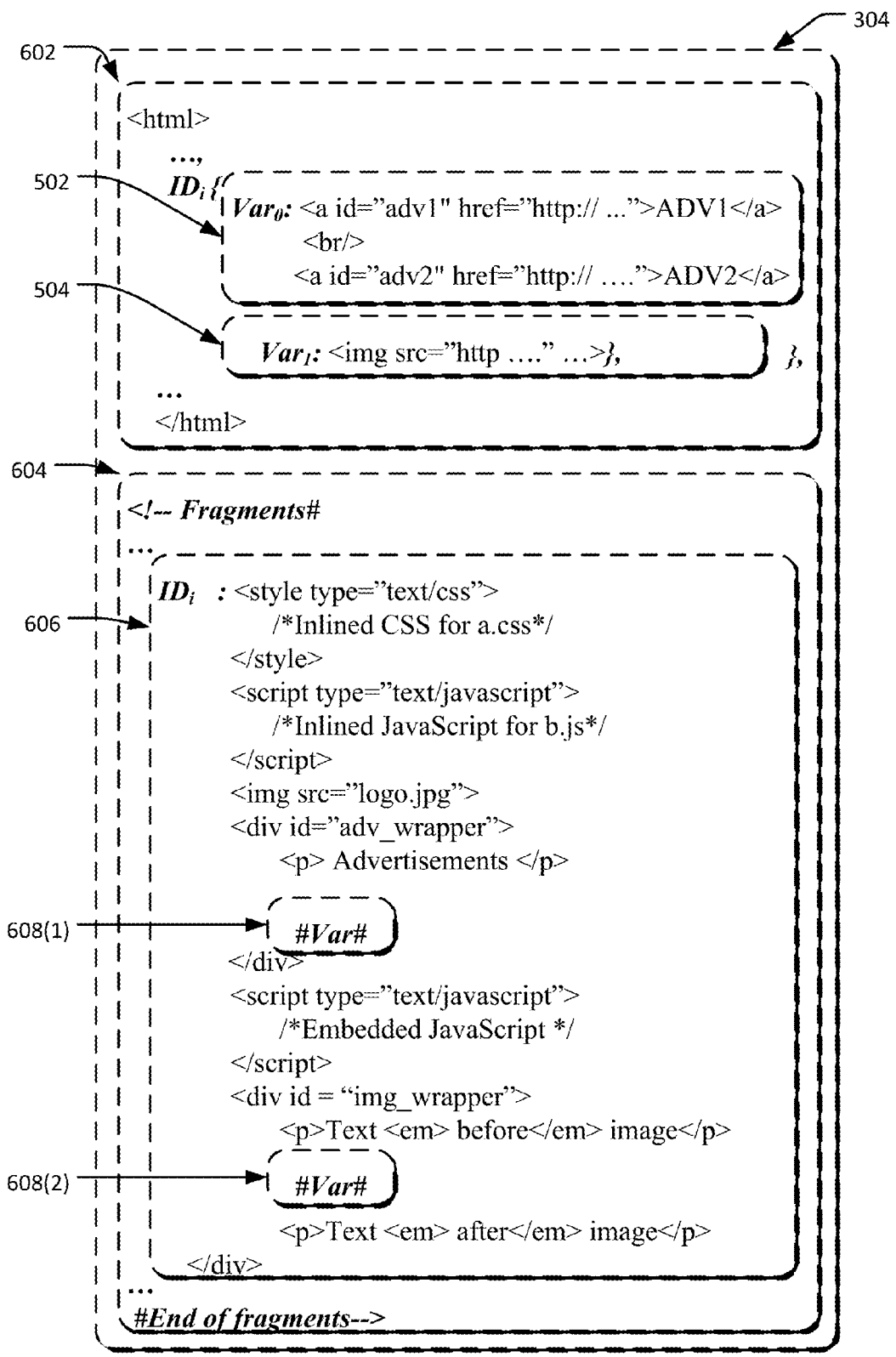
FIG. 6 illustrates an example structure-based data representation of the inlined web page.

FIG. 6 illustrates an example structure-based data representation 304 of the inlined web page 302.

In the example of FIG. 6, the structure-based data representation 304 including two sections: a content section 602 and an appendix section 604. In the example of FIG. 6, if the computing system 112 determines that the characteristics of the cache-worthy structures 508, 510, and 512 are same or similar. The computing system may merge the cache-worthy structures 508, 510, and 512 into a cache-worthy structure 606.

The content section 602 includes the sequences of identifications of cache-worthy structures, such as $ID_i$ of the cache-worthy structure 606. The content section 602 may also include contents of the cache-unworthy structures. In content section 602, when a cache-unworthy structure is contained inside a cache-worthy structure in the document 102, the cache-unworthy structure is listed after and associated with the identification of the cache-worthy structure that contains it, and indexed according to their locations inside the cache-unworthy structure. When a cache-unworthy structure is not contained inside any cache-worthy structure in the document 102, the cache-unworthy structure is listed independently in the content section 602.

In the example of FIG. 6, the contents of the cache-unworthy structures 502 and 504 are included in the content section 602. In this example, the cache-unworthy structures 502 and 504 are contained inside the cache-worthy structure 606 whose identification is $ID_i$. Therefore the contents of the cache-unworthy structures 502 and 504 are listed inside the curly brackets after $ID_i$, indicating that they are contained inside the cache-worthy structure 606 whose identification is $ID_i$, and are indexed with $Var_0$ and $Var_1$, respectively, which indicate that which reference #VAR# inside the cache-worthy structure with identification $ID_i$ listed in block 606 should be replaced by the contents of the cache-unworthy structure after the index. Cache-unworthy structures not contained in any cache-worthy structures are also listed in the content section (not shown in FIG. 6) but not associated with any identification of cache-worthy structures.

The appendix section 604 includes contents of the cache-worthy structures whose identifications are listed in the content section 602. These cache-worthy structures may contain references to indicate the locations of cache-unworthy structures contained inside.

In the example of FIG. 6, the computing system merge the cache-worthy structures 508, 510, and 512 into the cache-worthy structure 606, with the cache-unworthy structures 502 between the cache-worthy structures 508 and 512 and the cache-unworthy structure 504 between cache-worthy structures 510 and 512 being replaced by identical symbol "#VAR#", indicated by arrows 608(1) and 608(2), respectively. The symbol "#VAR#" represents the special mark $U_s$ as described above. Each of the symbol "#Var#" indicates the location of the cache-unworthy structure 502 or 504 in the cache-worthy structure 606. The computing system 112 then calculates the identification of the resulting cache-worthy structure 606, which is shown as $ID_j$ in FIG. 6. The content of the resulting cache-worthy structure 606 is listed in the appendix section 604.

In the example of FIG. 6, the content section 602 is a section enclosed by <html> and </html> and executable by the document viewer 108. The appendix section 604 is a comment section represented by <!-Fragments# . . . #End of fragments->, which are put into comments of a web page and thus ignored by the document viewer 108 such as a conventional web browser. Thus the contents in the appendix section 604 needs not to be transmitted if the client device 110 has already contained it in its cached structures 126, and there is no change in the contents of the cache-worthy structure 606. The computing system 112 may only send the data inside the content section 602 to the client device 110 to update the cache-unworthy structures 502 and 504.

When there are no cache structures at the client side 110, the structure-based data representation 304 including the content section 602 and the appendix section 604 is sent to the client device 110.

The client device 110 then caches the cache-worthy structures contained in the appendix section 604. Each of the cache-worthy structures can be specified with an expiration time.

To reconstruct the original representation of the web page 300 from the received structure-based data representation 304, the client device 110 may replace each identification with the contents of the corresponding cache-worthy structure, and if there is any #VAR# symbol inside a cache-worthy structure, replace the symbol(s) #VAR# contained inside a cache-worthy structure with the contents of the cache-unworthy structure inside the curly brackets after the corresponding identification. Indexing techniques can be used to match the reference and contents of the cache-unworthy structure. The original inlined web page 302 is then reconstructed. It is then sent to the document viewer 108 such as a conventional browser to process and render on the client device 110 for the user 106 to view and interact.

In the example shown in FIG. 6, the cache-unworthy structure 502, which is the first cache-unworthy structure inside the curly brackets after $ID_j$ of cache-worthy structure 606, replaces the first #Var# inside the cache-worthy structure 606. The cache-unworthy structure 504, which is the second cache-unworthy structure inside the curly brackets after $ID_j$ of cache-worthy structure 606, replaces the second #Var# inside the cache-worthy structure 606. In this example, the cache-unworthy structures contained inside the curly brackets after an identification means that the cache-unworthy structures are contained inside the cache-worthy structure represented by the identification.

When the client device 110 sends the subsequent request 128 to visit the web page 102 again, it sends the identifications of the cached structures 126. The computing system 112 detects that the client device 110 has the cache-worthy structure 606 cached at the memory 124 of the client device 110. After comparing ID of the cache-worthy structure 606 cached at the memory 124 of the client device with current ID of the cache-worthy structure and finding the two are identical, the computing system 112 may determine that there is no change to the cache-worthy structure 606, and only send the contents in the content section 602. There is no need to send the contents in the appendix section 604. Thus redundant data transmission is greatly reduced.

FIG. 7 illustrates an example update of the structure-based data representation 304 of the inlined web page 302. In the example of FIG. 7, a new cache-unworthy structure 702 "<img src="new_logo.jpg" . . . >" is inserted into the cache-worthy structure 606 as shown in FIG. 6. Then the computing system 112 forms a new cache-worthy structure identified by $ID_k$. The new cache-worthy structure identified by $ID_k$ includes a reference of the new cache-unworthy structure 702 indexed as $Var_2$. The contents in the appendix section may contain instructions to update the prior cache-worthy structure 606. Upon receiving the subsequent request from the client device 110 including the identifications of the prior cached structures, the computing system 112 compares the received identifications of the prior structures cached at the client device 110 with those of current structures contained in a current version of the structure-based data representation, and obtain that the update of the cache-worthy structure 606 is the insertion of the new cache-unworthy structure 702.

The computing system 112 then sends the update structures and data not cached at the client device to the client device 110 together with the instructions contained in the appendix section to update the cache-worthy structure 606 to the new cache-worthy structure identified by $ID_k$. Thus the client device 110 knows how to update its cached cache-worthy structure 606 to the new cache-worthy structure identified by $ID_k$, and the location and the content of the new cache-unworthy structure 702 in the update document, and reconstructs the updated document based on the received data and prior cached structures. The client device 110 may also put the updated cache-worthy structure identified by $ID_k$ into its cached structure 126 and also deletes the old cache-worthy structure 606 from its cache.

Example Computing System

The described techniques may be implemented with various approaches. In one example, at least two proxies may be used. A server proxy residing at the computing system 112 performs the processing tasks at the server side. A local proxy residing at the client device 110 to process a document request, cache fragments, communicate with the server proxy, and reconstruct the document 102 such as the web page 300 from the structure-based data representation and cached fragments.

In another example, the described techniques are implemented at the server side. Therefore only the computing system 112 as the server needs to be modified to perform the described techniques. There is no change on the client side. In this approach, for instance, JavaScript™ and document object model ("DOM") storage may be used to implement the operations at the client side required by the described techniques to avoid any modification on the client side. The server may employ a HTML parser library to parse and analyze the web page.

The client device 110 or the computing system 112 may, but need not, be used to implement the techniques described herein. The client device 110 or the computing system 112 is only one example and is not intended to suggest any limitation as to the scope of use or functionality of the computer and network architectures.

The components of the client device 110 or the computing system 112 include one or more processors, and one or more memories. Generally, memories contain computer executable instructions that are accessible and executable by processor. Memories are examples of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Any number of program modules, applications, or components can be stored in the memory, including by way of example, an operating system, one or more applications, other program modules, program data, computer executable instructions.

For the sake of convenient description, the above client device 110 or the computing system 112 may be functionally divided into various modules which are separately described. When implementing the disclosed system, the functions of various modules may be implemented in one or more instances of software and/or hardware.

The client device 110 or the computing system 112 may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

In the distributed computing environment, a task is executed by remote processing devices which are connected through a communication network. In distributed computing environment, the modules may be located in storage media (which include data storage devices) of local and remote computers.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

We claim:

1. A method performed by one or more processors configured with computer executable instructions, the method comprising:
    partitioning a document into a plurality of structures based on one or more characteristics of different portions of the document, the one or more characteristics including a first lifespan of a first structure and a second lifespan of a second structure, the first lifespan of the first structure being distinct from the second lifespan of the second structure;
    determining that the first lifespan of the first structure is above a first threshold;
    determining that the second lifespan of the second structure is below the first threshold;
    classifying the first structure as a first cache-worthy structure of one or more cache-worthy structures;
    classifying the second structure as a first cache-unworthy structure of one or more cache-unworthy structures; and
    generating a structure-based data representation of the document based in part on the classifying the one or more cache-worthy structures or the one or more cache-unworthy structures.

2. A method as recited in claim 1, further comprising:
    requesting a client device to cache contents in the one or more cache-worthy structures; and
    requesting the client device to cache one or more reusable fragments in the one or more cache-unworthy structures.

3. A method as recited in claim 1, wherein the one or more characteristics further include:
    a type of data contained in the first structure;
    a relationship of the first structure with the second structure or a third structure; and
    a level of sharing of the first structure in one or more documents.

4. A method as recited in claim 1, wherein the classifying the first structure as the first cache-worthy structure of the one or more cache-worthy structures is based in part on the one or more characteristics.

5. A method as recited in claim 1, further comprising classifying one or more structures of the plurality of structures that are shared by multiple documents as the one or more cache-worthy structures.

6. A method as recited in claim 1, further comprising adjusting one or more structures of the plurality of structures based on the one or more characteristics, the adjusting comprising at least one of:
    merging the one or more structures with same or similar characteristics into one structure;
    merging the one or more structures of dependent relationship into one structure;
    merging a third structure whose size is smaller than a second threshold to an adjacent fourth structure;
    splitting a fifth structure containing two parts of different characteristics whose dissimilarity is beyond a third threshold into at least two structures; and
    splitting a sixth structure whose size is larger than a fourth threshold into multiple structures.

7. A method as recited in claim 1, wherein the one or more cache-unworthy structures is contained inside the first cache-worthy structure, and wherein the generating the structure-based data representation of the document comprises:

replacing the one or more cache-unworthy structures contained inside the first cache-worthy structure with a reference;

generating an identification for the first cache-worthy structure;

placing a first content of the one or more cache-unworthy structures together with the identification of the first cache-worthy structure that contains the one or more cache-unworthy structures in a content section of the structure-based data representation; and placing a second content of the one or more cache-worthy structures and including the reference in the first cache-worthy structure in an appendix section of the structure-based data representation.

8. A method as recited in claim 7, wherein the generating the identification for the first cache-worthy structure comprises using a collision-free hash function or calculating shingles to generate the identification for the first cache-worthy structure, wherein the identification is unique.

9. A method as recited in claim 7, wherein the reference is a placeholder for the one or more cache-unworthy structures contained inside the first cache-worthy structure.

10. A method as recited in claim 7, wherein the reference is an index to the one or more cache-unworthy structures contained in the first cache-worthy structure.

11. A method as recited in claim 1, further comprising:
maintaining a current version of the structure-based data representation of the document;
receiving a request for the document, the request including a received identification of prior cached data at a client device;
comparing the received identification with an identification of the one or more cache-worthy structures in the current version of the structure-based data representation; and
transmitting an updating data not cached at the client device.

12. A method as recited in claim 11, further comprising:
instructing the client device to adapt the prior cached data together with the updating data and to construct an updated version of the document from the updating data and the prior cached data.

13. A method as recited in claim 12, wherein the instructing the client device to adapt the prior cached data comprises instructions for:
merging, splitting, or adjusting the prior cached data; and
using delta-encoding caching techniques to reuse unchanged portions of the one or more cache-worthy structure or a fragment of one of the one or more cache-unworthy structures.

14. A method as recited in claim 1, wherein the document is a web page and the partitioning the document into the plurality of structures based on the one or more characteristics of different portions of the document comprises:
parsing the web page into a plurality of basic building units;
monitoring changes of the plurality of basic building units; and
merging one or more of the plurality of basic building units into one structure.

15. A method as recited in claim 14, wherein merging the one or more of the plurality of basic building units comprises:
collecting multiple copies of the web page;
comparing the multiple copies of the web page to obtain an estimate of a lifespan of individual ones of the one or more of the plurality of basic building units; and
merging the one or more of the plurality of basic building units of a same or similar lifespan into a structure.

16. One or more computer storage media having stored thereupon a plurality of instructions that, when executed by one or more processors, causes the one or more processors to perform operations comprising:
partitioning a web page into a plurality of structures based on one or more characteristics of different portions of the web page;
identifying one or more cache-worthy structures and one or more cache-unworthy structures of the plurality of structures; and
generating a structure-based data representation of the web page based on a classification of the one or more cache-worthy structures and the one or more cache-unworthy structures, the generating comprising:
replacing a first cache-unworthy structure of the one or more cache-unworthy structures contained inside a first cache-worthy structure of the one or more cache-worth structures with a reference;
generating an identification for the first cache-worthy structure;
placing a first content of the first cache-unworthy structure together with the identification of the first cache-worthy structure that contains the first cache-unworthy structure in a content section of the structure-based data representation; and
placing a second content of the first cache-worthy structure and the reference in the first cache-worthy structure in an appendix section of the structure-based data representation.

17. A device comprising:
one or more processors,
memory storing instructions that, when executed by the one or more processors, configure the device to perform operations comprising:
partitioning a document into a plurality of structures based on one or more characteristics of different portions of the document, the one or more characteristics including a first lifespan of a first structure and a second lifespan of a second structure, the first lifespan of the first structure being distinct from the second lifespan of the second structure;
determining that the first lifespan of the first structure is above a first threshold;
determining that the second lifespan of the second structure is below the first threshold;
classifying the first structure as a first cache-worthy structure of one or more cache-worthy structures;
classifying the second structure as a first cache-unworthy structure of one or more cache-unworthy structures; and
generating a structure-based data representation of the document based in part on the classifying the one or more cache-worthy structures or the one or more cache-unworthy structures.

18. A device as recited in claim 17, wherein the one or more characteristics further include:
a type of data contained in the first structure;
a relationship of the first structure with the second structure or a third structure; and
a level of sharing of the first structure in one or more documents.

19. A device as recited in claim 17, wherein the operations further comprise adjusting one or more structures of the plurality of structures based on the one or more characteristics, the adjusting comprising at least one of:

merging the one or more structures with same or similar characteristics into one structure;

merging the one or more structures of dependent relationship into one structure; merging a third structure whose size is smaller than a second threshold to an adjacent fourth structure;

splitting a fifth structure containing two parts of different characteristics whose dissimilarity is beyond a third threshold into at least two structures; and splitting a sixth structure whose size is larger than a fourth threshold into multiple structures.

20. A device as recited in claim 17, wherein the operations further comprise:

maintaining a current version of the structure-based data representation of the document;

receiving a request for the document, the request including a received identification of prior cached data at a client device;

comparing the received identification with an identification of the one or more cache-worthy structures in the current version of the structure-based data representation; and transmitting an updating data not cached at the client device.

* * * * *